Figure 5:
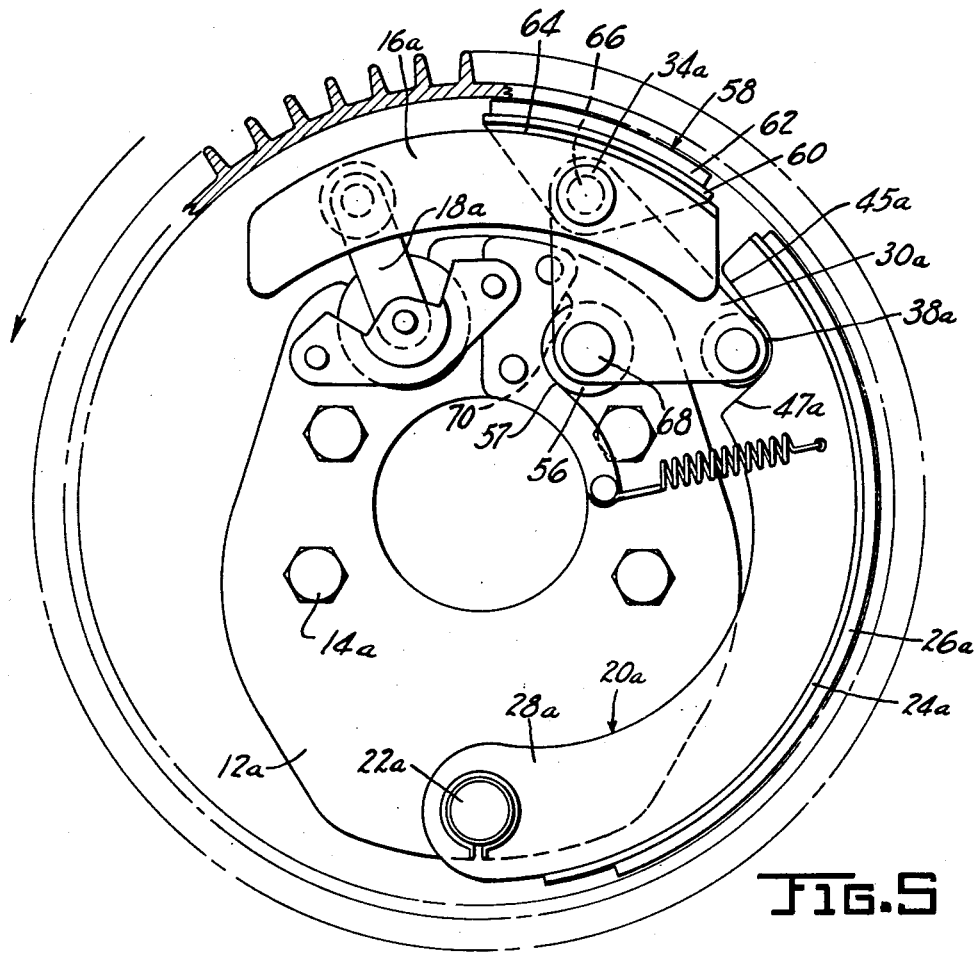

Aug. 30, 1960  J. L. MOSSEY  2,950,783
FRICTION DEVICE
Filed Nov. 9, 1955  3 Sheets-Sheet 1
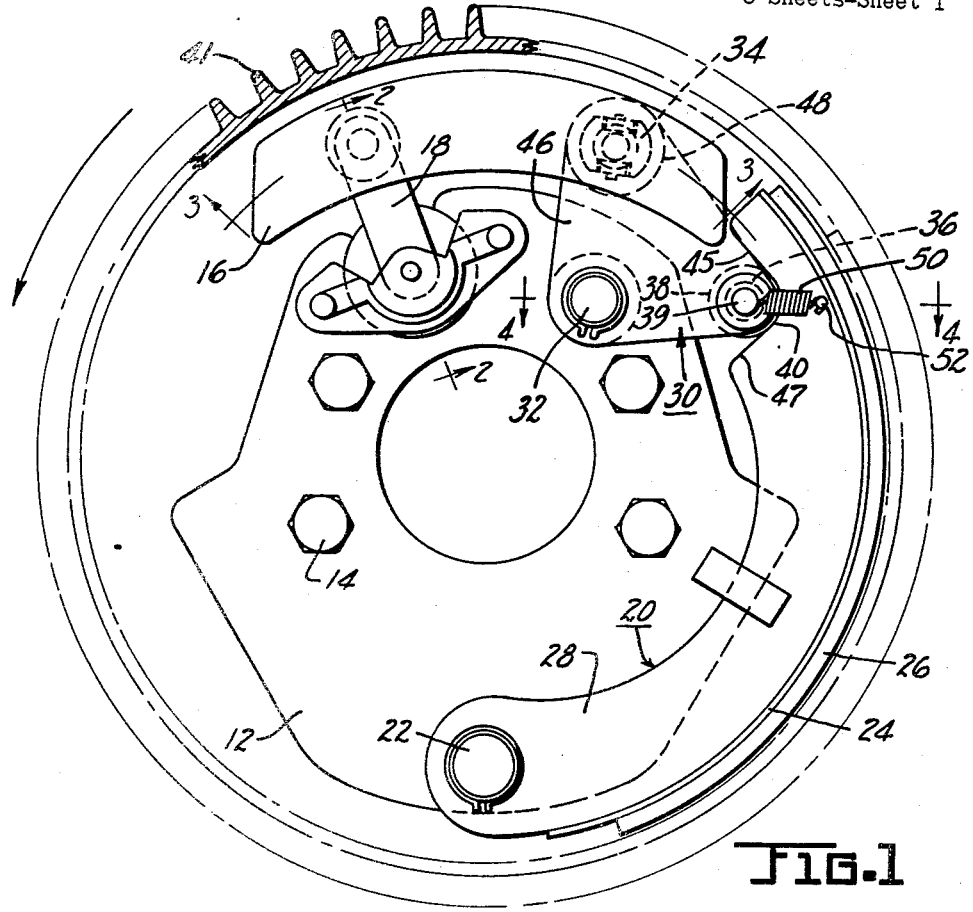
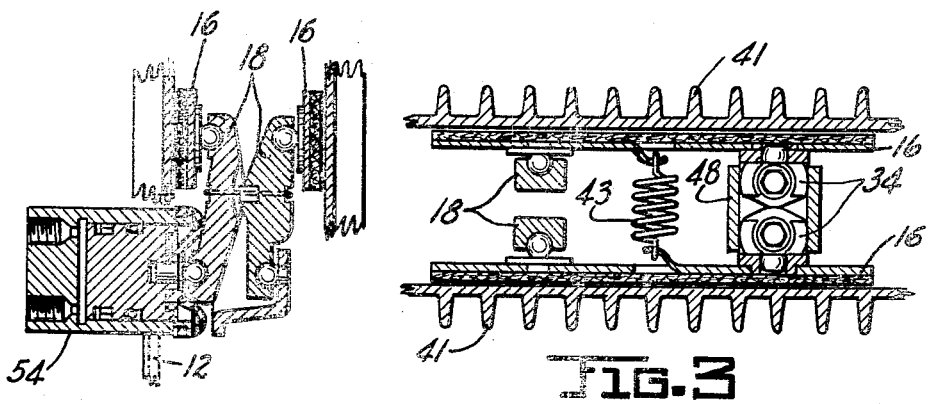
INVENTOR.
JOSEPH L. MOSSEY
BY
John A. Young
ATTORNEY Aug. 30, 1960    J. L. MOSSEY    2,950,783
FRICTION DEVICE Filed Nov. 9, 1955    3 Sheets-Sheet 2

INVENTOR.
JOSEPH L. MOSSEY
BY John A. Young
ATTORNEY

United States Patent Office 2,950,783
Patented Aug. 30, 1960

2,950,783
FRICTION DEVICE

Joseph L. Mossey, South Bend, Ind., assignor to The Bendix Corporation, a corporation of Delaware Filed Nov. 9, 1955, Ser. No. 545,901

10 Claims. (Cl. 188—70)

This invention relates to a friction device wherein laterally applied friction elements are directly applied by the operator and develop necessary applying force for an arcuate "shoe" friction element which is radially applied. The present invention is related to co-pending application No. 482,827, filed January 19, 1955, now Patent No. 2,910,144. The present invention and the invention shown in the cited application are related in that the arcuate shoe is de-energizing during forward application so that it acts as a "trailing" shoe brake. The purpose in providing a trailing shoe brake is to minimize performance variations owing to change in brake effectiveness during brake application.

One of the objects of the invention is to provide an applying linkage between the "disk" and "arcuate" shoe elements through which applying effort is exerted on the arcuate shoe friction element during braking in both directions.

A further object of the invention is to provide a camming arrangement which develops applying thrust on an arcuate shoe friction element in a braking system having both disk and arcuate shoes which are independently pivoted in the brake.

A further object of the invention is to utilize a camming arrangement in conjunction with an applying linkage so that the torque reaction from disk brake elements may exert any preferred applying effort on the shoe friction element through said applying linkage.

An important part of the present invention is that the applying linkage is freely floatable to ensure that applying effort on the arcuate shoe remains proportionate to circumferential movement of the disk elements.

A very significant feature of the invention is that of providing a camming arrangement wherein but a single cam is required to apply the arcuate friction element, this result being obtained by contouring a cammed surface in which different faces of the cammed surfaces are engaged depending upon the direction of movement of the applying linkage.

A further feature of the invention is that the applying linkage not only develops applying force for the arcuate friction element but also can be used to apply a second arcuate friction element.

An over-all object of the invention is to improve brake effectiveness by increasing applying effort on the arcuate shoe friction element through camming devices.

Figure 4:
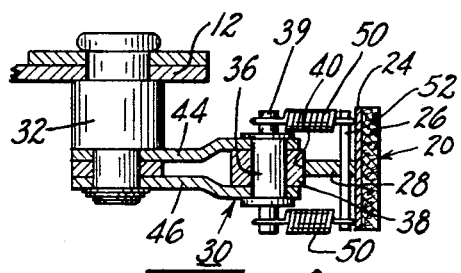
Figure 6:
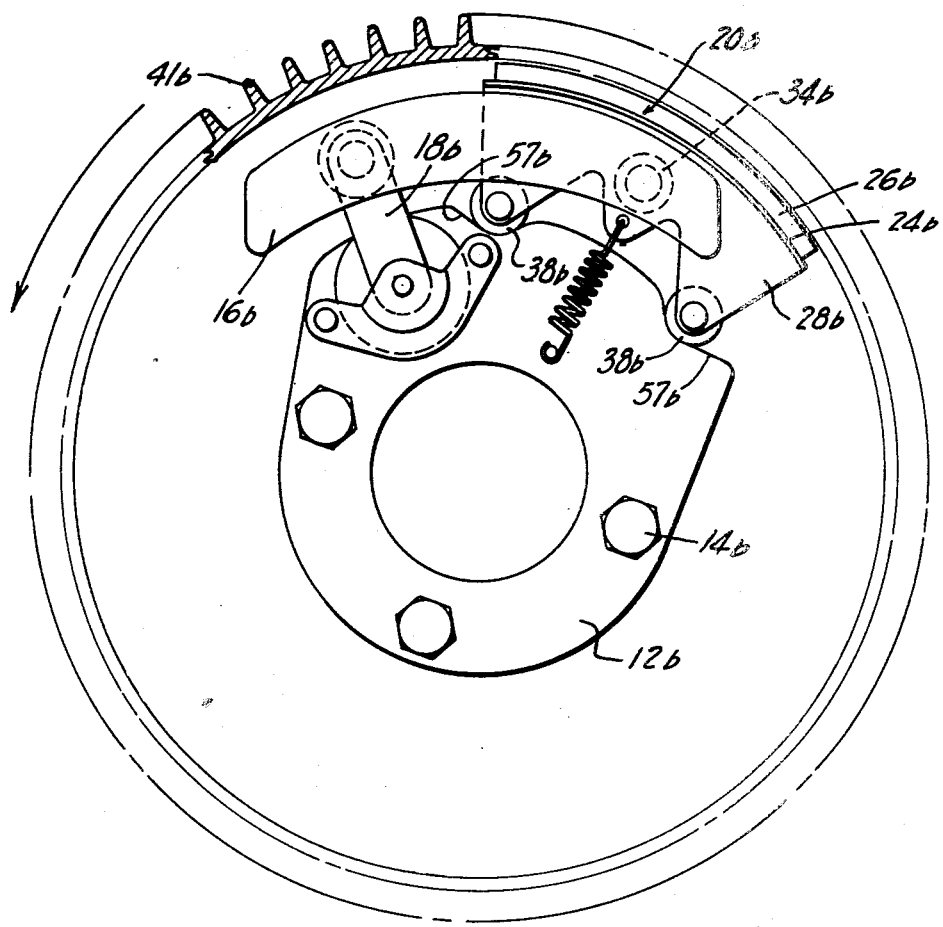

The above and other objects and features of the invention will appear more fully hereinafter from a consideration of the following description, taken in connection with the accompanying drawings wherein a plurality of embodiments of the invention are illustrated by way of example. In the drawings:

Figure 1 is a side elevation of a brake assembly constituting a first embodiment of the invention. A part of the rotor is removed so that the brake assembly may be better viewed;

Figures 2, 3, and 4 are section views taken respectively on the lines 2—2, 3—3, and 4—4 of Figure 1;

Figure 5 is a side elevation of a second embodiment of the invention with a part of the rotor removed; and Figure 6 is a side elevation of a yet further embodiment of the invention.

Referring to the embodiment shown in Figures 1 to 4, a stationary torque-taking plate 12 is secured to a fixed part of the vehicle such as an axle flange (not shown) by means of bolts or the like 14. Two oppositely acting "disk" friction elements 16 are laterally applied by articulated levers 18 in the manner described in co-pending application No. 433,609, filed June 1, 1954, now Patent No. 2,927,664. An arcuate shoe friction element 20 is pivoted at one end on an anchor 22 which is received in the torque-taking member 12.

The arcuate shoe 20 consists of a rim 24 having friction material lining 26 and a transverse strengthening web 28. Between the "disk" and "arcuate" shoe there is a bell crank 30 which is secured to the torque-taking member 12 through a pivot post 32 which permits swinging of the bell crank about the post in either clockwise or counterclockwise direction. The bell crank is joined with the disk and arcuate shoe elements at the other two ends through camming devices 34 and 36, respectively. The camming devices 34 may, if desired, be constructed similarly to the ones shown in co-pending application No. 486,184, filed February 4, 1955, now Patent No. 2,849,088. Cam 36 (Figures 1 and 4) consists of a roller 38 which fits into a notch 40 in the end of the web 28 of the brake shoe.

The sides of the notch are cam surfaces 45 and 47 which are engaged by the roller 38.

The pin 39 which is used to journal the roller 38 is carried at opposite sides by two stampings 44 and 46 which are spaced apart sufficiently to receive the roller 38 therebetween (Figure 4). The stampings 44 and 46 are attached at one end to a bushing 48 which receives the self energizing cams 34 so that circumferential movement of the disk elements causes turning or swinging movement of the bell crank about post 32.

Two return springs 50 (Figures 1 and 4) are attached between opposite ends of post 39 and opposite ends of a second upright member 52 which is located in the web 28 of the arcuate brake shoe 20. The return springs 50 are located on opposite sides of the web so that no offset lateral load is exerted on the arcuate shoe. The tension in the springs 50 causes the roller 38 to bottom in the notch 40, thus causing turning of the shoe to disengage lining 26 from frictional engagement with the rotor 41.

Assuming forward rotation of the vehicle, the rotor 41 (fully described and claimed in co-pending application No. 434,846, filed June 7, 1954), now abandoned is turning in a counterclockwise direction (Figure 1). When the operator develops applying force through a pedal or the like, fluid motor 54 operates the articulate levers 18 to spread the disk elements 16 apart bringing the friction material lining thereon into forcible engagement with the spaced sides of the rotor. The engagement of the "disk" friction elements with these spaced sides of the rotor produces a tendency for the disk elements to shift with the rotor in a counterclockwise direction owing to the wiping action between the friction surfaces of the disk elements and the sides of the rotor with which they are engaged. As the disk elements shift in a counterclockwise direction, the bell crank 30 is caused to swing in a counterclockwise direction about post 32. This turning of the bell crank causes the cam 38 to mount side 45 of the camming surface formed at the end of the web 28. The cam 38, while climbing the cam surface 45, exerts a radial force on the shoe 20 causing it to turn on the anchor pin 22. As the shoe is turned on the anchor pin 22, the friction material lining 26 is brought into forcible engagement with the cylindrical surface of the rotor. The bell crank 30 is held against further turning on post 32 when the shoe 20 is fully engaged. Any further circumferential shifting of the disk elements 16 is relative to the bell crank 30 so that the camming devices 34 will then exert lateral spreading force on the disk elements.

When the brake is released, a suitable return spring 43 (Figure 3) is provided between the disk elements for releasing them from engagement with the rotor. The springs 50 then rotate both the bell crank 30 and the shoe 20 until the cam 38 is returned to the nadir of the notch 40. The arcuate shoe 20, being thus pivoted in the manner described, is retracted from engagement with the cylindrical surface of the rotor.

In reverse vehicle movement the rotor turns clockwise and the engagement of disk elements 16 with the rotor produces a tendency of the disk elements to shift with the rotor in a clockwise direction. The disk elements 16, which are connected with the bell crank 30 through the cams 34, cause the bell crank 30 to turn in a clockwise direction about pivot post 32. The roller cam 38 is now caused to climb the side 47 which forms one of the cammed surfaces in web 28. The end of the arcuate shoe is thus cammed radially outward causing the entire shoe to turn at the end mounted on anchor 22. In this way, the shoe is forced into frictional engagement with the cylindrical surface of the rotor. When the operator releases applying effort, the disk elements are disengaged and the shoe is pivoted to retracted position by the springs 50, the bell crank being pivoted in a counterclockwise direction during retraction of the arcuate shoe. It will be noted that the arcuate shoe is energizing during brake application in this direction of rotor movement.

Referring next to the embodiment shown in Figure 5, parts of the brake assembly corresponding to those previously described will receive the same reference numeral with the subscript "a." Disk elements 16a which are actuated by articulated levers 18a are connected with a floatable bell crank 30a which is fastened at one end with the disk element 16a through cams 34a and at the other end bears against cam surfaces 45a or 47a through a roller cam 38a. The arcuate shoe 20a has a rim 24a with friction material lining 26a and a transverse strengthening web 28a which is mounted on an anchor 22a fixedly secured to torque-taking plate 12a.

The "off" position of the bell crank 30a is determined by the location of a cam 56 with respect to a notch 57 that is formed in the torque-taking member 12a. A second friction element 58 is associated with disk elements 16a. The friction element 58 comprises a rim 60 having friction material lining 62 in a mounting segment 64 which is joined to the disk elements in any suitable manner such as, for example, by journal pin or the like 66.

When the device is operated, the disk elements 16a are initially brought into engagement with the sides of the rotor just as in the prior embodiment. Assuming forward vehicle movement with counterclockwise rotation of the rotor, the disk elements tend to move with the rotor in a counterclockwise direction owing to the wiping action between the disk elements and the engageable sides of the rotor. Counterclockwise movement of the disk elements causes the floatable bell crank 30a to turn counterclockwise on trunnion 68.

Rotation of the bell crank causes the roller cam 38a to mount side 45a of the camming surface formed in the web 28a at the end of the arcuate shoe 20a.

When the arcuate shoe is fully applied, no further movement of the bell crank is permitted. It will be understood that all turning of the bell crank 30a is producible by the wiping action between the disk elements and the sides of the rotor. When the device is fully applied, the disk elements are in engagement with the spaced sides of the rotor and the arcuate friction element 20a is in engagement with the cylindrical surface of the rotor.

When the brake is released, the disk elements are returned in any suitable manner. The bell crank 30a is returned to its original position so that the cam 56 contacts the lowermost part of the notch 57. The brake shoe 20a is retracted from the cylindrical surface of the rotor by turning the bell crank to its original position and rotating the arcuate shoe.

During braking in the opposite direction of vehicle movement, the rotor turns clockwise and the disk elements are caused to shift therewith in a clockwise direction when the device is initially operated. The floatable bell crank 30a is turned in a clockwise direction with the roller cam 38a mounting side 47a to apply the arcuate shoe 20a.

When the shoe is fully applied, the cam 56 mounts side 70 as the disk elements 16a continue to shift in a clockwise direction. It will be noted that the fulcrum of the bell crank 30a changes from cam 56 to the cylindrical cam 38a after the arcuate shoe 20a is fully applied and can pivot no further on anchor 22a. The bell crank thus exerts applying force on friction element 58.

When the brake is released, each of the friction elements is retracted in the same manner as in the previous embodiment.

Considering next the embodiment shown in Figure 6, parts of the brake corresponding to those previously described will receive the same reference numeral with the subscript "b" attached thereto. The disk elements 16b are actuated by articulated levers 18b when the operator actuates the device. The disk friction elements 16b are attached to a second friction element 20b through a cam arrangement 34b. Friction element 20b consists of a rim 24b having friction material lining 26b and a strengthening web 28b. Roller cams 38b are mounted at the inner portion of the web to the friction element 20b. The roller cams are cooperable with camming surfaces 57b which are contoured in torque-taking member 12b. In operation, the disk elements are initially spread apart to engage the sides of the rotor. The wiping action between the disk elements and the rotor produces a tendency of the disk elements to shift with the rotor in the same direction. Assuming forward movement of the vehicle during braking, the rotor 41b is turning in a counterclockwise direction causing the disk elements to move therewith (Figure 6). The disk elements, being joined to the friction element 20b through the camming devices 34b also cause the latter to shift in a counterclockwise direction. When the friction element 20b moves counterclockwise, the roller cams 38b are caused to mount camming surfaces 57b thus biasing the device in a radial direction to apply the friction material lining 26b against the cylindrical surface of the rotor 41b.

When the friction element 20b is held against further circumferential movement, any further movement of the disk element relatively thereto, produces additional lateral spreading force on the disk elements as developed by cams 34b.

During reverse vehicle movement with clockwise rotation of the rotor, engagement of the disk elements produces a clockwise shifting therewith. The friction element 20b is also caused to move in a clockwise direction owing to the connection of the disk elements therewith through the cams 34b. The rollers 38b are then caused to mount the sides of the camming surfaces 57b so that the friction element is biased in a radial direction causing lining 26b to engage the cylindrical surface of the rotor. When the friction element 20b is held against further circumferential movement, the cams 34b exert additional spreading force on the disk elements 16b if the latter should continue to move in a circumferential sense.

It will be understood from a consideration of the operation of the device, that arcuate "shoe" braking is obtained in either direction of vehicle movement. When the brake is released, any suitable return spring expedient may be used to return the various elements to their initial or retracted position.

From a consideration of the foregoing description it will be apparent that the principles of the invention are susceptible of numerous applications. The example embodiments are illustrative of the invention and are not intended to be restrictive thereof. It will be understood that the numerous adaptations of the invention which embody the principles thereof are intended to be included within the scope of the following claims.

I claim:

1. A kinetic-energy-absorbing device comprising an arcuate friction element which is mounted for pivotal movement, a pair of disk brake elements which are movable in opposite directions along a line parallel to the pivotal axis of said arcuate friction element and which are shiftable in a plane perpendicular to their direction of movement, a bell crank pivotally secured to a fixed member, means for securing one end of said bell crank to the disk brake elements so that shiftable movement of said brake elements produces turning of said bell crank, and cam means located between the other end of said bell crank and the applied end of said arcuate friction element, said cammed means including cam surfaces formed on the applied end of said arcuate friction element so that turning of said bell crank imparts applying thrust on said arcuate friction element.

2. A friction device comprising a pair of disk elements which are initially spread apart in operating the device, an arcuate friction element having a lined rim, anchoring means associated with one end of said arcuate friction element and providing a pivot therefor, a stationary torque-taking means, and biasing means mounted for swinging movement on said torque-taking means and connecting said disk and arcuate friction elements, a first camming means joining said disk elements and said biasing means and arranged to spread apart said disk elements and a second camming means between said biasing means and arcuate friction element which develops thrust on said arcuate friction element responsively to turning of the biasing means.

3. A friction device in combination with a U-shaped cross section rotor comprising two separately pivoted friction units, one of said units including a pair of disk brake elements which are laterally actuated along a line parallel to the pivotal axis of rotation of the unit, the other of said units including an arcuate friction element which is radially actuated, a torque-taking means, and an applying means joining said disk and arcuate friction elements, said applying means including cams which assist in moving apart said disk elements and a pivot for said applying means on said stationary torque-taking means about which said applying means turns to thereby exert applying force on the arcuate friction element, said applying means being further arranged to pivot on said arcuate friction element to produce radial applying thrust on a portion of said arcuate brake element to engage said portion with a cylindrical side of said rotor.

4. A friction device comprising two separately pivoted friction units, one of said units comprising oppositely applied disk elements movable apart along a line parallel to the pivotal axis of the unit, applying means operatively secured to said disk elements while providing for pivotal movement thereof, torque-taking means arranged to pivot said applying means, the other of said units comprising a principal arcuate shoe adapted for radial application by said applying means when the applying means is pivoted in either direction and a secondary arcuate shoe which is applied by said applying means during braking in one direction only as said applying means pivots on said primary shoe, and means interconnecting said units to translate pivotal movement of said disk elements to applying effort on said shoe element, said last mentioned means including cams which assist in moving apart said disk elements and further transmitting applying force to said principal and secondary arcuate shoes.

5. A friction device including two friction elements which are movable in opposite directions along a common axis and which are constructed with flat sector shaped friction surfaces, said elements also being shiftable in a plane perpendicular to their axis of movement, means for constraining shifting of the friction elements, an arcuate friction element which is pivoted independently of said oppositely-acting friction elements, means for both pivoting and anchoring said arcuate friction element, force-transmitting turnable cam means interconnecting said oppositely-acting friction elements and arcuate friction element to develop applying force on the arcuate friction element responsively to shifting of said oppositely-acting friction elements.

6. A friction device according to claim 5 including a bell crank having a camming connection with said arcuate friction element and a camming connection with said oppositely-acting friction elements.

7. A friction device according to claim 6 in which the camming device associated with the arcuate friction element consists of a camming roller carried by the bell crank and a notched cam profile constructed on said arcuate friction element so that turning of the bell crank in either direction will produce radially outward movement of the arcuate friction element.

8. In a friction device, the combination of two separately pivoted friction units, one of said units comprising a pair of disk members which are movable apart along a line parallel to the pivotal axis of the unit, the other of said units including an arcuate shoe element, means for moving apart said disk elements while providing for pivotal movement thereof, and means interconnecting said units to translate pivotal movement of said disk elements to applying effort on said shoe element, said last mentioned means including cams which assist in moving apart said disk elements and further transmit applying force to said shoe element.

9. In a friction device having a support member, the combination of an arcuate friction element mounted on said support member for limited pivotal movement, disk friction elements which are movable in opposite directions along a line parallel to the pivotal axis of said arcuate friction element and shiftable in a plane perpendicular to said line of movement, means for mounting said disk elements to be in end-to-end relation with said arcuate friction element, means connecting said disk and arcuate friction elements to translate shifting of said disk elements to applying force on said arcaute element, and floatable camming means including a camming member carried by said connecting means and a cam follower formed integrally with the adjacent end of said arcuate friction element to exert applying force on said arcuate element responsively to shifting of said disk elements in either direction.

10. A brake structure in accordance with claim 8 wherein said means for interconnecting said units includes a floatable lever, a cam and a cam surface which is so contoured that radially directed applying force on the shoe is developed through said floatable lever in either direction of turning of said lever.

References Cited in the file of this patent

UNITED STATES PATENTS

| | | |
|---|---|---|
| 1,603,963 | Liebowitz | Oct. 19, 1926 |
| 1,838,131 | Bendix et al. | Dec. 29, 1931 |
| 1,925,897 | Fawick | Sept. 5, 1933 |
| 2,065,382 | Levy | Dec. 22, 1936 |
| 2,070,470 | Clench | Feb. 9, 1937 |
| 2,355,827 | Stelzer | Aug. 15, 1944 |
| 2,602,525 | Jurgens | July 8, 1952 |
| 2,751,046 | Tack | June 19, 1956 |
| 2,849,088 | Burnett | Aug. 26, 1958 |

FOREIGN PATENTS

| | | |
|---|---|---|
| 457,483 | Italy | Mar. 20, 1950 |